(12) United States Patent
Matousek et al.

(10) Patent No.: US 8,833,047 B2
(45) Date of Patent: Sep. 16, 2014

(54) ROTARY CUTTER-STYLE CROP CONDITIONING HEADER HAVING END-MOUNTED ROTARY SHEAR

(71) Applicant: AGCO Corporation, Duluth, GA (US)

(72) Inventors: Robert A. Matousek, Hesston, KS (US); Brian D. Olander, Buhler, KS (US)

(73) Assignee: AGCO Corporation, Duluth, GA (US)

( * ) Notice: Subject to any disclaimer, the term of this patent is extended or adjusted under 35 U.S.C. 154(b) by 81 days.

(21) Appl. No.: 13/723,250

(22) Filed: Dec. 21, 2012

(65) Prior Publication Data

US 2013/0160414 A1    Jun. 27, 2013

Related U.S. Application Data

(60) Provisional application No. 61/578,395, filed on Dec. 21, 2011.

(51) Int. Cl.
*A01D 43/00* (2006.01)

(52) U.S. Cl.
CPC ........................ *A01D 43/00* (2013.01)
USPC ............................. 56/157; 56/10.7

(58) Field of Classification Search
USPC ................. 56/157, 153, 14.5, 14.7, 10.7
See application file for complete search history.

(56) References Cited

U.S. PATENT DOCUMENTS

| | | | | |
|---|---|---|---|---|
| 3,456,429 A * | 7/1969 | Sexton, Jr. | | 56/13.7 |
| 4,035,996 A * | 7/1977 | Fernandez et al. | | 56/13.9 |
| 4,301,644 A * | 11/1981 | Henderson | | 56/14.3 |
| 4,365,461 A * | 12/1982 | Schutt | | 56/14.3 |
| 6,158,201 A | 12/2000 | Pruitt et al. | | |
| 6,718,743 B2 | 4/2004 | Rosenbalm et al. | | |
| 7,165,381 B2 * | 1/2007 | Rosenbalm et al. | | 56/6 |
| 7,454,888 B2 | 11/2008 | Barnett | | |
| 7,681,388 B1 * | 3/2010 | Hinds et al. | | 56/126 |
| 7,726,108 B1 | 6/2010 | Pruitt et al. | | |
| 8,006,469 B2 * | 8/2011 | Barnett | | 56/6 |
| 8,020,364 B2 * | 9/2011 | Walch | | 56/320.1 |
| 8,297,033 B2 | 10/2012 | Pruitt et al. | | |
| 2003/0110751 A1 * | 6/2003 | Rosenbalm et al. | | 56/16.6 |
| 2005/0126142 A1 * | 6/2005 | Rosenbalm et al. | | 56/6 |
| 2007/0204587 A1 * | 9/2007 | Rosenbalm et al. | | 56/119 |
| 2008/0016837 A1 * | 1/2008 | Rosenbalm et al. | | 56/192 |
| 2009/0071116 A1 * | 3/2009 | Barnett | | 56/153 |

* cited by examiner

*Primary Examiner* — Árpád Fábián-Kovács

(57) ABSTRACT

A rotary conditioning header has upright end panels that project forwardly from opposite ends of the rotary cutter bar. A top panel structure spans the end panels across their upper ends to define a crop receiving space between the end panels and beneath the top panel structure that is open at the front to define a mouth into the header. An upright rotary shear on at least one of the ends panels is located within the crop receiving space at the edge of the mouth but is exposed at the front such that its forwardmost cutting extremity is generally aligned with but underneath a transverse lean bar across the front edge of the top panel structure. The rotary shear severs and separates tangled crop stalks in the vicinity of the end panel to enable the stalks to be properly acted upon by the lean bar and received into the mouth.

10 Claims, 6 Drawing Sheets

ROTARY CUTTER-STYLE CROP CONDITIONING HEADER HAVING END-MOUNTED ROTARY SHEAR

CROSS REFERENCE TO RELATED APPLICATIONS

This application claims priority to U.S. Provisional Application No. 61/578,395 filed Dec. 21, 2011, entitled "ROTARY CUTTER-STYLE CROP CONDITIONING HEADER HAVING END-MOUNTED ROTARY SHEAR".

TECHNICAL FIELD

The present invention relates to harvesting equipment and, more particularly, to improvements in crop conditioning headers of the type sometimes referred to as "rotary headers" which use a transverse cutter bar having a series of rotary cutters rotatable about individual upright axes for severing standing crop material from the ground as the machine travels through a field.

BACKGROUND

It is well known in the art to utilize rotary headers on self-propelled and/or pull-type machines. Such headers typically have a pair of upright end panels at opposite ends of the cutter bar that project forwardly from the cutter bar and define a crop-receiving space immediately ahead of the cutter bar and between the end panels. Horizontal top panel structure overlies and covers the crop-receiving space so that the space is enclosed across the top and down the sides but is open at the front to define a mouth where the standing crop materials enter the header. The transverse front edge of the horizontal top panel structure serves as a lean bar to deflect the top ends of standing crop materials forwardly with respect to the direction of travel of the header so that the lower ends of the crop materials enter the mouth first for cutoff. Consequently, the severed crop materials are encouraged to enter conditioning mechanism behind the cutter bar butt-end-first for orderly processing and handling. Protective rubberized curtains typically hang from the lean bar across the mouth of the receiving space.

Tall, stalky crops such as forage sorghum can be particularly difficult to harvest and condition with rotary headers because the stalks of one row frequently become tangled and interlocked with stalks in an adjacent row. Consequently, at opposite ends of the header where the end panels are supposed to separate stalks of a row being harvested from those in an adjacent row outside the header, the tangled, criss-crossed stalks simply cannot be separated by the end panels and acted upon by the lean bar in a manner to properly direct the stalks into the restricted confines of the mouth of the header.

SUMMARY OF THE INVENTION

The present invention provides a way of cleanly separating still-rooted crop materials inboard of the end panels from those outboard of the end panels to encourage the desired leaned-forward, orderly entry of crop materials into the header mouth for cut-off and conditioning. In order to achieve such separation, at least one of the end panels, and preferably both, is provided with a strategically positioned, upright rotary shear on the front end of the end panel at the edge of the mouth for cutting through the jumble of overhanging stalks and materials at that location to release inboard materials from those outboard of the header. The cutting rotor of the shear is located just inside the end panel with its axis of rotation disposed behind the lean bar and its forwardmost cutting extremity disposed generally in vertical alignment with the lean bar.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. Directional references in the following description such as, for example, "front", "rear", "left" and "right" are made as if the machine were being viewed from the rear looking forwardly.

Figure 1:
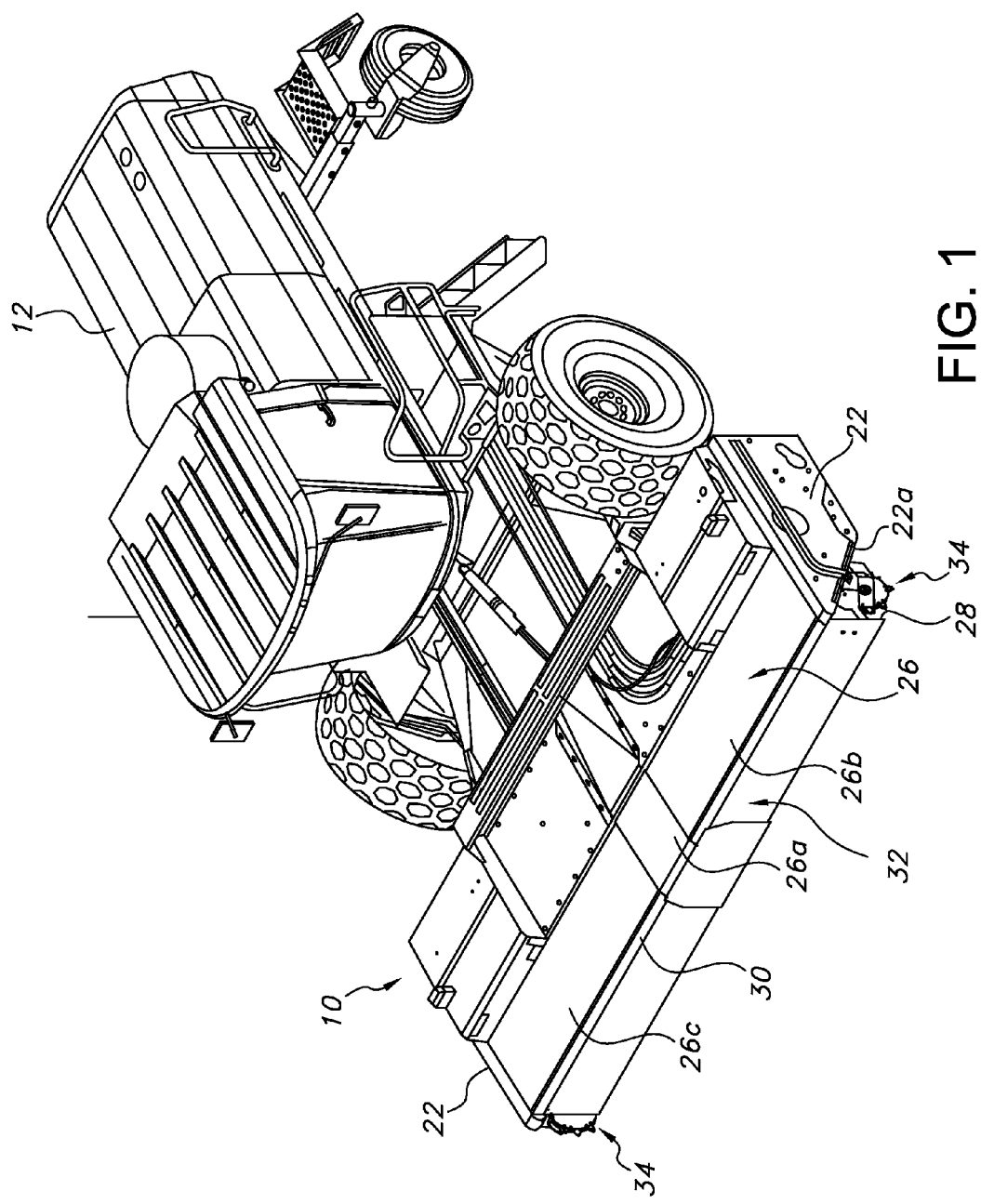
FIG. 1 is a left front perspective view of a self-propelled windrower employing a rotary header in accordance with the present invention.
Figure 2:
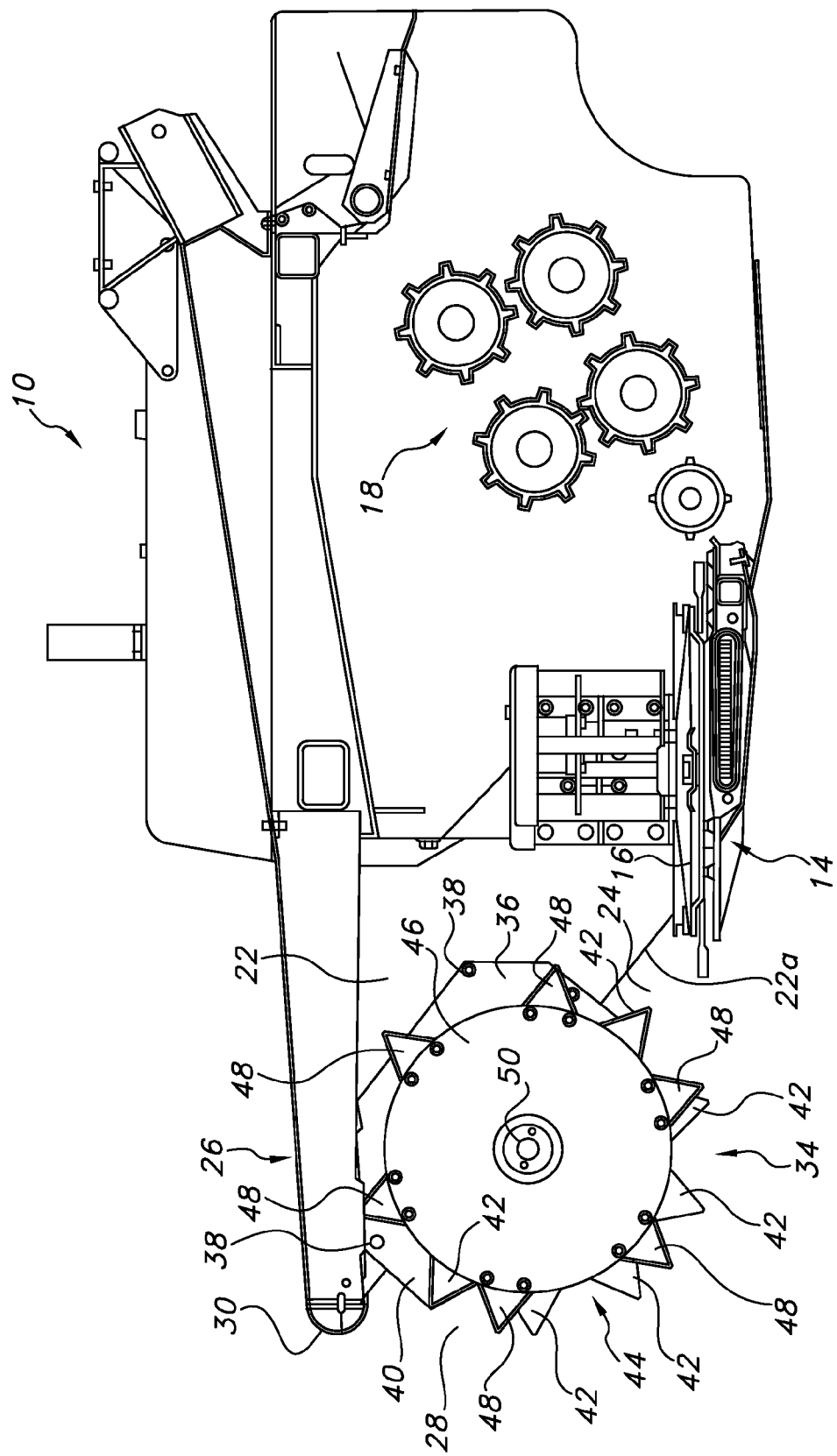
FIG. 2 is an enlarged, fragmentary, schematic, left side elevational view of the header with the near end panel and front curtains removed to reveal details of construction.
Figure 3:
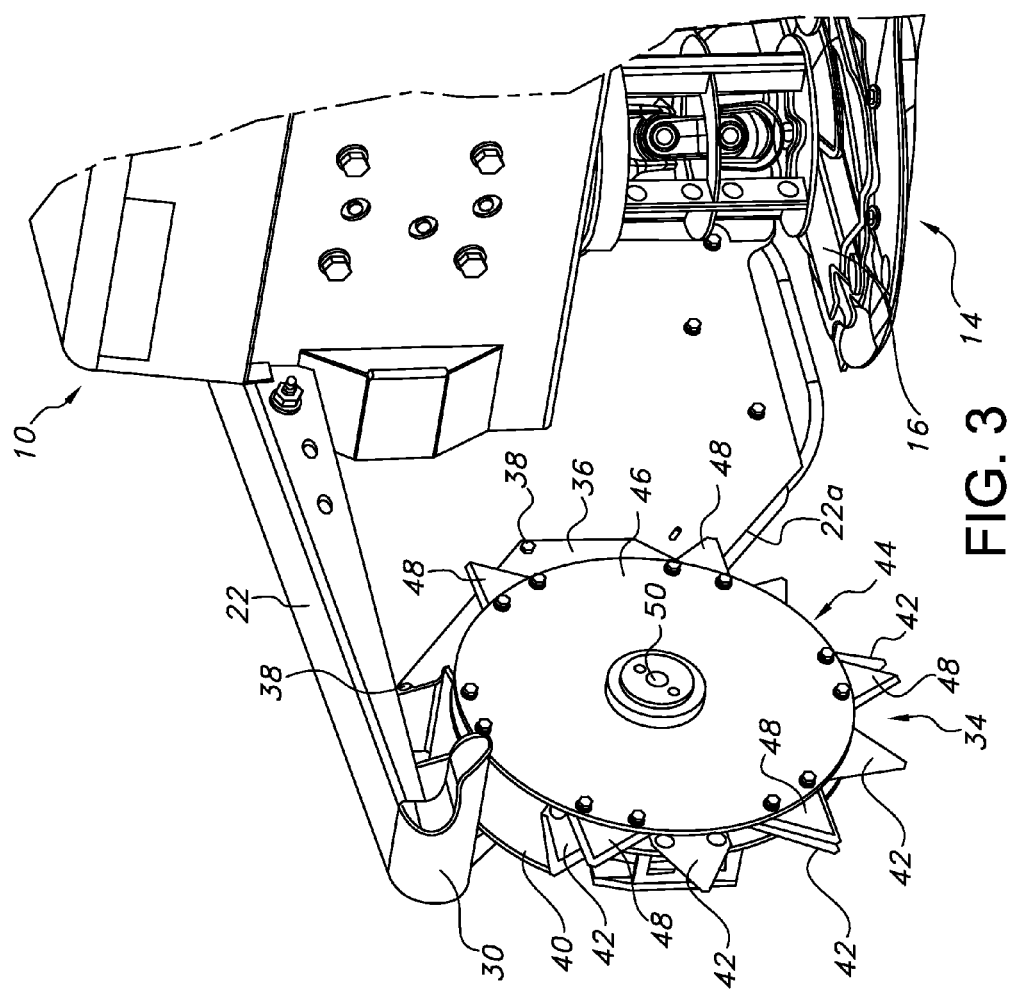
FIG. 3 is an enlarged, left front perspective view of the right end of the header illustrating in particular the rotary shear attached to the inside surface of the right end panel.

The rotary style harvesting header 10 in FIG. 1 is illustrated as being attached to the chassis of a self-propelled tractor 12, but it is within the purview of the present invention to have header 10 attached to a pull-type chassis if desired. Rotary header 10 includes a transverse cutter bar 14 (FIGS. 2-6) having a series of rotary cutters 16 that are mounted for rotation about individual upright axes for severing crop materials from the ground as header 10 advances through a field. Crop conditioning mechanism 18 in the form of ribbed conditioning rolls or the like is disposed upwardly and rearwardly behind cutter bar 14 for receiving severed materials from cutter bar 14 and conditioning such materials before returning them to the ground in a windrow or swath.

Header 10 has a centrally disposed opening 20 in an interior rear wall thereof through which the severed materials are directed as they leave cutter bar 14 and approach conditioning mechanism 18. Depending upon the size and cut width of header 10, opening 20 may extend the full length of cutter bar 14 or be shorter than cutter bar 14. In the latter case, one or more of the cutters 16 will be disposed outboard of opening 20 at each end of header 10, and crop materials severed by such outboard cutters will be directed laterally inwardly to opening 20 by the cutters themselves with or without the assistance of supplemental conveying apparatus such as augers or impellers.

Header 10 includes a pair of upright end panels 22 at opposite ends of cutter bar 14 that project forwardly from cutter bar 14 to define a crop receiving space 24 in front of cutter bar 14 and between end panels 22. A horizontal top panel structure 26 spans end panels 22 at their upper ends to overlie and cover space 24 so as to cooperate with end panels 22 in defining a mouth 28 to header 10 at the front extremity of space 24. The leading transverse edge of top panel structure 26 presents a horizontal lean bar 30 that engages standing crop materials and bends their upper ends forwardly with respect to the direction of travel of the harvester so that the bottom ends of the crop materials are more readily severed by cutter bar 14 and enter opening 20 and conditioning mechanism 18 butt-end-first. Top panel structure 26 may be divided into a stationary central portion 26a and a pair of left and right, liftable door portions 26b and 26c that are hinged at the rear to provide easy access to cutter bar 14 for service or otherwise. A rubberized protective curtain 32 may hang from lean bar 30 across mouth 28 for safety purposes.

At least one of the end panels 22, and preferably both as illustrated in the drawings, is provided with an upright rotary shear 34 at the edge of mouth 28 in accordance with the present invention. Each rotary shear 34 comprises a stationary mounting plate 36 secured to the interior surface of the corresponding end panel 22 by bolts 38 or the like and lying flatly against end panel 22. Mounting plate 36 has a front end that projects forwardly beyond the rearwardly inclined front termination 22a of end panel 22 to present an exposed, arcuate nose 40 having a plurality of circumferentially spaced, radially outwardly extending, triangular projections 42 thereon. Projections 42 may comprise extensions of mounting plate 36 or bolted on individual knife sections.

Each rotary shear 34 further comprises an upright, rotatable cutting rotor 44 supported by mounting plate 36. Cutting rotor 44 includes a circular plate 46 having a plurality of radially outwardly projecting triangular knife blades 48 bolted to the periphery thereof at circumferentially spaced locations. Knife blades 48 may advantageously comprise the type of knife sections used on a typical reciprocal sickle bar and cooperate with the edges of stationary projections 42 to provide a scissor-like cutting action during rotation of rotor 44.

Figure 4:
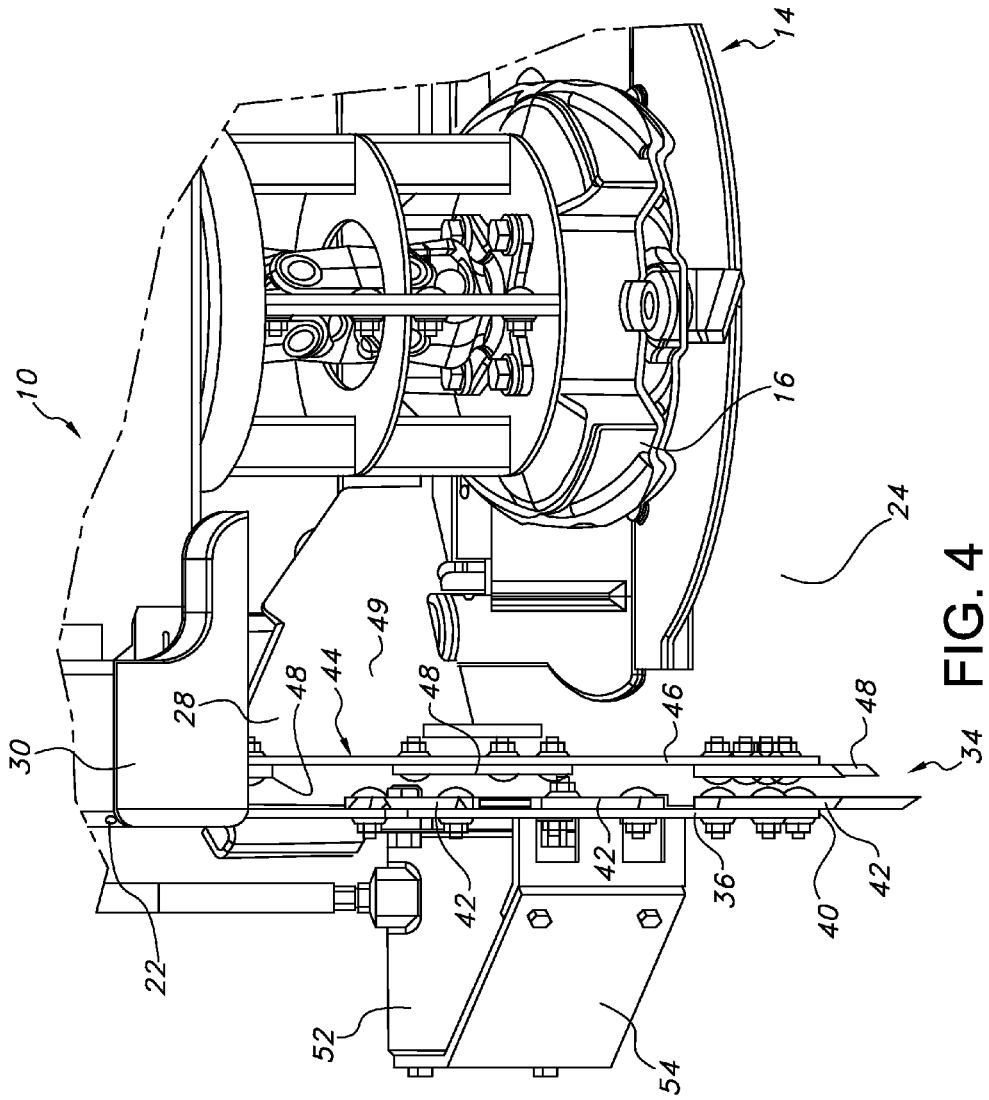
FIG. 4 is an enlarged, fragmentary front perspective view of the rotary shear on the right end panel.
Figure 5:
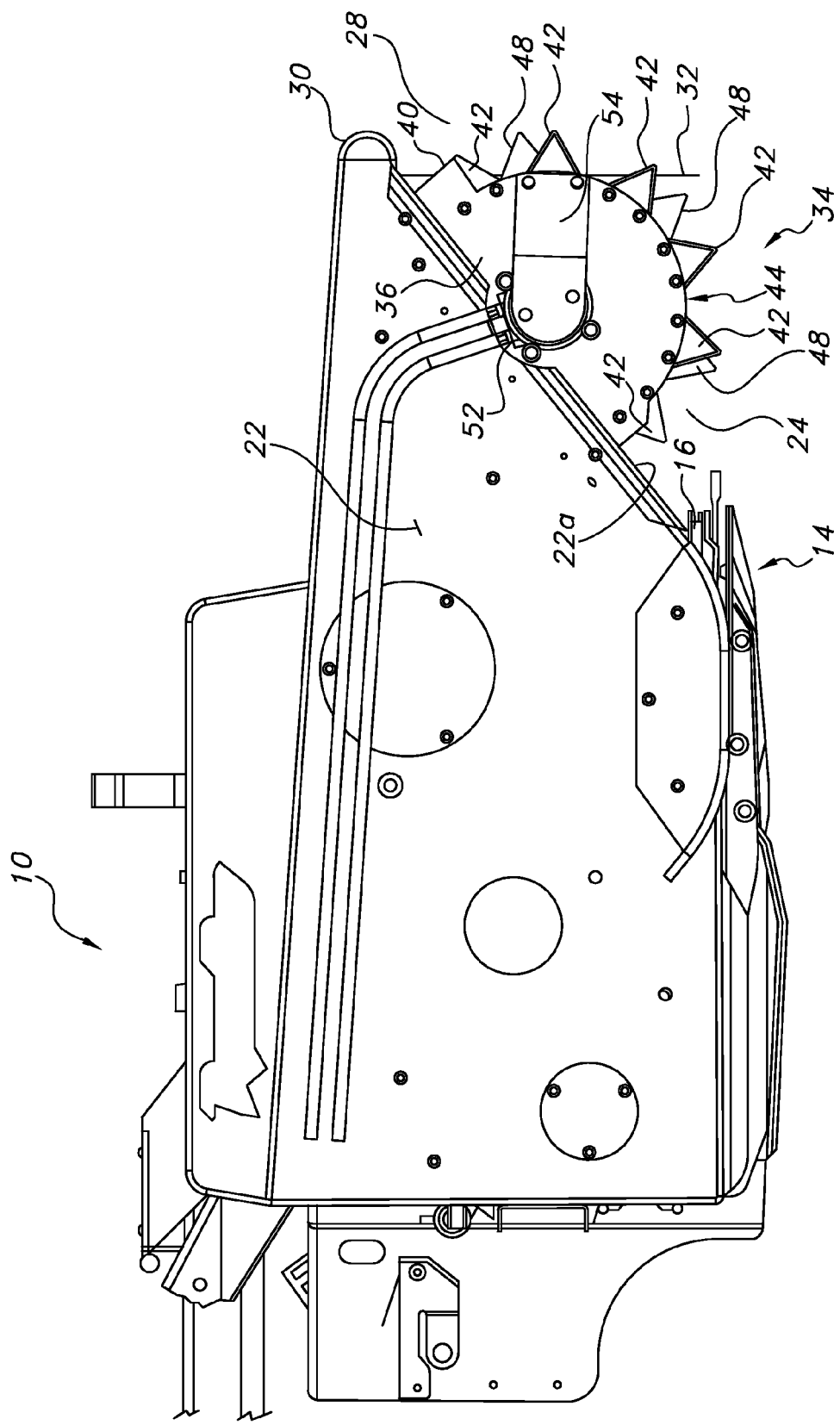
FIG. 5 is an enlarged end elevational view of the right end of the header.
Figure 6:
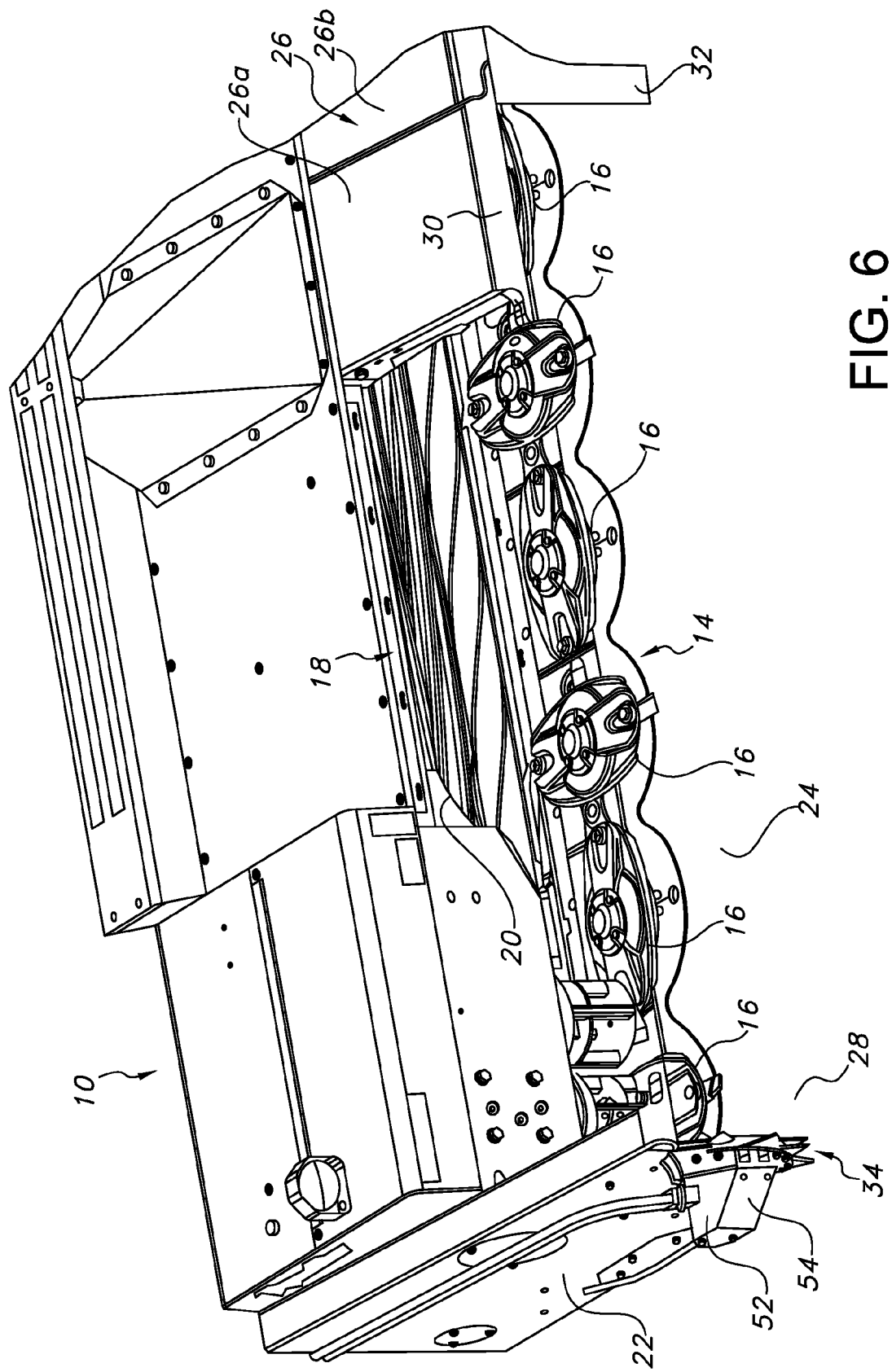
FIG. 6 is a fragmentary, right front perspective of the header with portions of the top panel structure and front curtain removed to reveal details of construction.

As illustrated particularly in FIG. 4, cutting rotor 44 is disposed within crop receiving space 24 just inside the adjacent end panel 22 for rotation in a vertical plane parallel to end panel 22. As also seen in FIG. 4, an end region 49 is defined between the end panel 22 and the upright axis of rotation of the endmost cutter 16 of cutter bar 14, and cutting rotor 44 is disposed in fore-and-aft alignment with such region 49.

Cutting rotor 44 has an axis of rotation 50 that is spaced forwardly from cutter bar 14, rearwardly from lean bar 30, and substantially below the top edge of end panel 22. The knife blades 48 define an arcuate, forwardmost cutting extremity of cutting rotor 44, such cutting extremity being disposed generally in vertical alignment with lean bar 30 below the latter.

Each rotary shear 34 further comprises a motor 52, preferably a rotary hydraulic motor, on the outboard side of mounting plate 36 for driving cutting rotor 44. A bracing strap 54 helps stabilize and secure motor 52 to mounting plate 36. A drive shaft of motor 52 passes through mounting plate 36 and is secured to cutting rotor 44 for supplying driving power to the rotor. Axis of rotation 50 is defined by the longitudinal axis of the drive shaft. Motor 52 is preferably reversible so that cutting rotor 44 may be rotated in either rotative direction as necessary or desirable. In some crop conditions, it has been found desirable to rotate cutting rotor 44 in such a direction that knife blades 48 move upwardly along the forwardmost cutting extremity of cutting rotor 44; in other crop conditions, it has been found desirable to rotate cutting rotor 44 in such a direction that knife blades 48 move downwardly along the forwardmost cutting extremity of cutting rotor 44.

As header 10 is advanced through a field of standing crop materials, the materials enter receiving space 24 through mouth 28 and are severed from the ground by cutter bar 14. The severed materials then pass rearwardly through opening 20 into conditioning mechanism 18, where they are crimped and returned to the ground in the form of a swath or windrow. Importantly, lean bar 30 engages the top ends of the materials as they enter mouth 28 and bends them forwardly so that the lower ends of the materials are the first ends presented to cutter bar 14. This encourages the materials to pass through opening 20 and into conditioning mechanism 18 with their severed butt ends leading, to assure proper crimping action from the conditioning mechanism all along the stems or stalks of the materials. In tall stalky crops such as forage sorghum, the stalks may sometimes be lying down, crisscrossed, and tangled up in jumbled clumps. Stalks near the end panels 22 may drape over into the uncut crop materials outboard of the header, and, conversely, stalks from outside the header may hang over into the inboard area within the path of travel of the header. But the knife blades of the rotary shear nearest the uncut area are effective to cut through any such stalks and allow the lean bar 30 to deflect the top ends of the stalks forwardly in the desired manner. Although the mouth 28 presents a relatively tight, confined area that the stalks must enter, once their connections with outlying stalks have been severed, they much more readily pass into receiving space 24 in the intended butt-first manner for severance and conditioning.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims. The inventors hereby state their intent to rely on the Doctrine of Equivalents to determine and assess the reasonably fair scope of their invention as pertains to any apparatus or method not materially departing from but outside the literal scope of the invention as set out in the following claims.

The invention claimed is:
1. A crop harvesting header for attachment to a mobile chassis comprising:
   a transverse cutter bar extending across the normal path of travel of the header and including a series of rotary cutters rotatable about individual upright axes;
   a pair of upright end panels at opposite ends of the cutter bar and projecting forwardly therefrom to define a crop-receiving space between the panels and ahead of the cutter bar;
   top panel structure overlying said crop-receiving space and extending between said end panels, said top panel structure including a leading, transverse edge for engaging standing crop materials as the header moves through a field and for leaning upper ends of the standing materials forwardly with respect to the direction of travel of the header as lower ends of the crop materials enter said crop-receiving space in preparation for severance by said cutter bar;

crop conditioning mechanism behind said cutter bar for receiving and conditioning crop materials that have been severed from the ground by the cutter bar; and an upright rotary shear on at least one of said end panels, said rotary shear including a cutting rotor disposed within said crop-receiving space and rotatable about a transverse horizontal axis that is disposed rearwardly behind and below said leading edge of the top panel structure.

2. A crop harvesting header as claimed in claim 1, said cutting rotor having a forwardmost cutting extremity that is disposed generally in vertical alignment with said leading edge of the top panel structure.

3. A crop harvesting header as claimed in claim 1, said cutting rotor comprising a plate and a plurality of knife blades mounted on said plate at circumferentially spaced locations around the plate.

4. A crop harvesting header as claimed in claim 3, said rotary shear further comprising a stationary member having a plurality of stationary edges that cooperate with said knife blades during rotation of the cutting rotor.

5. A crop harvesting header as claimed in claim 1, said rotary shear further comprising a motor operably coupled with said cutting rotor for effecting powered rotation of the cutting rotor.

6. A crop harvesting header as claimed in claim 5, said motor comprising a rotary hydraulic motor.

7. A crop harvesting header as claimed in claim 1, said cutting rotor being disposed forwardly of said cutter bar.

8. A crop harvesting header as claimed in claim 1, said end panel being spaced laterally outwardly from the axis of rotation of an endmost rotary cutter on said cutter bar to define a region between said end panel and said axis of rotation of said endmost rotary cutter, said cutting rotor being forwardly aligned with said region.

9. A crop harvesting header as claimed in claim 8, said cutting rotor having a forwardmost cutting extremity that is disposed generally in vertical alignment with said leading edge of the top panel structure.

10. A crop harvesting rotor as claimed in claim 1, further comprising a second upright rotary shear on the other of said end panels, said second rotary shear including a cutting rotor disposed within said crop-receiving space and rotatable about a transverse horizontal axis that is disposed rearwardly behind and below said leading edge of the top panel structure, said cutting rotor of the first-mentioned rotary shear and said cutting rotor of the second rotary shear having forwardmost cutting extremities that are disposed generally in vertical alignment with said leading edge of the top panel structure.

* * * * *